(12) United States Patent
McTargett

(10) Patent No.: US 8,333,361 B2
(45) Date of Patent: Dec. 18, 2012

(54) WIRELESS POWER TRANSFER DEVICE FOR A FLUID DELIVERY APPARATUS

(75) Inventor: Charles W McTargett, Fishers, IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 1027 days.

(21) Appl. No.: 12/080,529

(22) Filed: Apr. 3, 2008

(65) Prior Publication Data

US 2008/0245422 A1 Oct. 9, 2008

Related U.S. Application Data

(60) Provisional application No. 60/922,471, filed on Apr. 9, 2007.

(51) Int. Cl.
*F16K 31/02* (2006.01)

(52) U.S. Cl. .............. 251/129.04; 251/129.06; 455/41.1

(58) Field of Classification Search ............ 251/129.06, 251/129.04; 318/16; 455/41.1–41.3, 274
See application file for complete search history.

(56) References Cited

U.S. PATENT DOCUMENTS

| | | | |
|---|---|---|---|
| 4,735,357 A * | 4/1988 | Gregory et al. ............. | 236/93 R |
| 4,852,802 A | 8/1989 | Iggulden et al. | |
| 4,948,090 A | 8/1990 | Chen | |
| 5,829,467 A * | 11/1998 | Spicher ............................ | 137/14 |
| 6,436,299 B1 | 8/2002 | Baarman et al. | |
| 6,568,424 B1 | 5/2003 | Galad et al. | |
| 6,673,250 B2 | 1/2004 | Kuennen et al. | |
| 6,718,568 B1 * | 4/2004 | Hensley .............................. | 4/675 |
| 6,883,541 B2 | 4/2005 | Hwang | |
| 6,975,198 B2 | 12/2005 | Baarman et al. | |
| 7,116,200 B2 | 10/2006 | Baarman et al. | |
| 2003/0213850 A1 * | 11/2003 | Mayer et al. ................ | 236/12.12 |
| 2003/0214255 A1 | 11/2003 | Baarman et al. | |
| 2004/0232845 A1 | 11/2004 | Baarman et al. | |
| 2005/0028254 A1 * | 2/2005 | Whiting ............................ | 4/213 |
| 2005/0067595 A1 | 3/2005 | Teti et al. | |
| 2005/0122058 A1 | 6/2005 | Baarman et al. | |
| 2005/0122059 A1 | 6/2005 | Baarman et al. | |
| 2005/0126571 A1 | 6/2005 | Jorczak et al. | |
| 2005/0127315 A1 | 6/2005 | Hollingsworth et al. | |
| 2005/0127850 A1 | 6/2005 | Baarman et al. | |
| 2006/0102432 A1 | 5/2006 | Matsumoto | |
| 2007/0228071 A1 * | 10/2007 | Kamen et al. .................... | 222/52 |

FOREIGN PATENT DOCUMENTS

WO WO 2005/089620 * 9/2005

OTHER PUBLICATIONS

ALTICOR, "Technology Offering,—eCoupled™ Inductive Power and Data Transfer", May 23, 2005, pp. 1-7.

* cited by examiner

*Primary Examiner* — John K Fristoe, Jr.
*Assistant Examiner* — Marina Tietjen
(74) *Attorney, Agent, or Firm* — Faegre Baker Daniels LLP

(57) ABSTRACT

A fluid delivery apparatus includes a fluid outlet located on a first side of a barrier and at least one electrically powered component located on a second side of the barrier. The apparatus also includes a wireless power transfer device to supply power to the electrically powered component.

25 Claims, 3 Drawing Sheets

WIRELESS POWER TRANSFER DEVICE FOR A FLUID DELIVERY APPARATUS

CROSS REFERENCE TO RELATED APPLICATION

This application claims the benefit of U.S. Provisional Application Ser. No. 60/922,471, filed on Apr. 9, 2007, which is expressly incorporated by reference herein.

BACKGROUND AND SUMMARY OF THE INVENTION

The present invention generally relates generally to the field of fluid delivery apparatus such as faucets. More particularly, the present invention relates to an improved power supply to provide electrical power to portions of a fluid delivery apparatus.

Often when it is desired to install a new fluid delivery apparatus or new components in an existing fluid delivery apparatus, certain components of the fluid delivery apparatus are located underneath a countertop, within a cabinet, or behind some other barrier without access to electrical power outlets. Therefore, if the fluid delivery apparatus includes components that require electrical power, a separate power line must be run underneath the countertop, into the cabinet, or behind the barrier to provide power to the fluid delivery apparatus components. The present invention facilitates supplying of power to components of the fluid delivery apparatus.

An illustrated embodiment of the present invention comprises a wireless power transfer device, illustratively an induction device, for use in connection with a fluid delivery apparatus. The wireless power transfer device is configured to transfer power from one side of a barrier, such as above a countertop, to an electrically powered component positioned on another side of the barrier, such as below the countertop.

In inductive power transfer, power is wirelessly transferred from a primary coil in a power supply circuit to a secondary coil in a secondary circuit. The secondary circuit is electrically coupled to a device, such as a motor, a battery charger or other component powered by electricity. The wireless connection provides a number of advantages over conventional hardwired connections. For instance, a wireless connection provides a relatively high level of electrical isolation between the power supply circuit and the secondary circuit.

In an illustrated embodiment, an inductively coupled power supply circuit drives a primary coil of an above-countertop device. A below-countertop device illustratively includes a secondary coil which is positioned below the deck and inductively receives power from the primary coil.

Illustratively, the above-countertop device plugs into a conventional power outlet above the countertop, while the below countertop device is in electrical communication with a portion of the fluid delivery device such as a recirculation pump or electronic valve positioned below the countertop. The recirculation pump may be of the type used to recirculate hot water from the hot water supply line to the cold water supply line, thereby providing a quick hot functionality to the faucet.

In one illustrative embodiment, the above-countertop device includes a motion sensor which is configured to activate the night light upon detecting the presence of an individual in proximity thereto. A motion detector may also illustratively be used to start a recirculation pump, heater, or cooling device below the countertop upon detecting motion in order to provide hot or cold water to a faucet as discussed below.

In an illustrated embodiment of the present invention, a fluid delivery apparatus comprises a fluid outlet located on a first side of a barrier such as a wall or a countertop and at least one electrically powered component located on a second side of the barrier. The electrical component provides a function of the fluid delivery apparatus. The apparatus also comprises a wireless power transfer device comprising a first portion coupled to a power supply on the first side of the barrier and a second portion located on the second side of the barrier to receive power from the first portion. The second portion is electrically coupled to the electrically powered component and supplies power to the electrically powered component.

In one illustrated embodiment, a user interface device is located on the first side of the barrier. The user interface device is configured to receive inputs from a user to control the fluid delivery apparatus. The first portion of the wireless power transfer device may also transmit data signals from the user interface device to the second portion. The data signals may be used by the electrically powered component to control the fluid delivery apparatus.

In another illustrated embodiment, an electrically powered device is coupled to the power supply on the first side of the barrier. The electrically powered device located on the first side of the barrier may comprise at least one of a night light, a clock, a radio, an MP3 player, a water temperature indicator, a temperature controller, a flow controller, and a user interface device for setting temperature, flow, or preset fill conditions.

In yet another illustrated embodiment, the at least one electrically powered component located on the second side of the barrier may comprise at least one of a temperature mixing valve, a flow control valve, a power supply, a back-up power supply, a filter module, a heating module, a cooling module, a recirculation pump, and an electronic diverter.

In a further illustrated embodiment, a method is provided for delivering fluid. The method comprises locating a fluid outlet on a first side of a barrier, such as a countertop, wall, cabinet or other enclosure, and providing at least one electrically powered component located on a second side of the barrier. The electrically powered component provides a function of the fluid delivery apparatus. The method also comprises wirelessly supplying power to the electrically powered component.

In an illustrated embodiment, the method further comprises wirelessly transmitting control signals from a user interface device to the electrically powered component to control the fluid delivery apparatus.

Additional features of the present invention will become apparent to those skilled in the art upon consideration of the following detailed description of the illustrative embodiments exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

For the purposes of promoting an understanding of the principles of the invention, reference will now be made to certain illustrated embodiments and specific language will be used to describe the same. It will nevertheless be understood that no limitation of the scope of the invention is thereby intended. Such alterations and further modifications of the invention, and such further applications of the principles of the invention as described herein as would normally occur to one skilled in the art to which the invention pertains, are contemplated, and desired to be protected.

Figure 1:
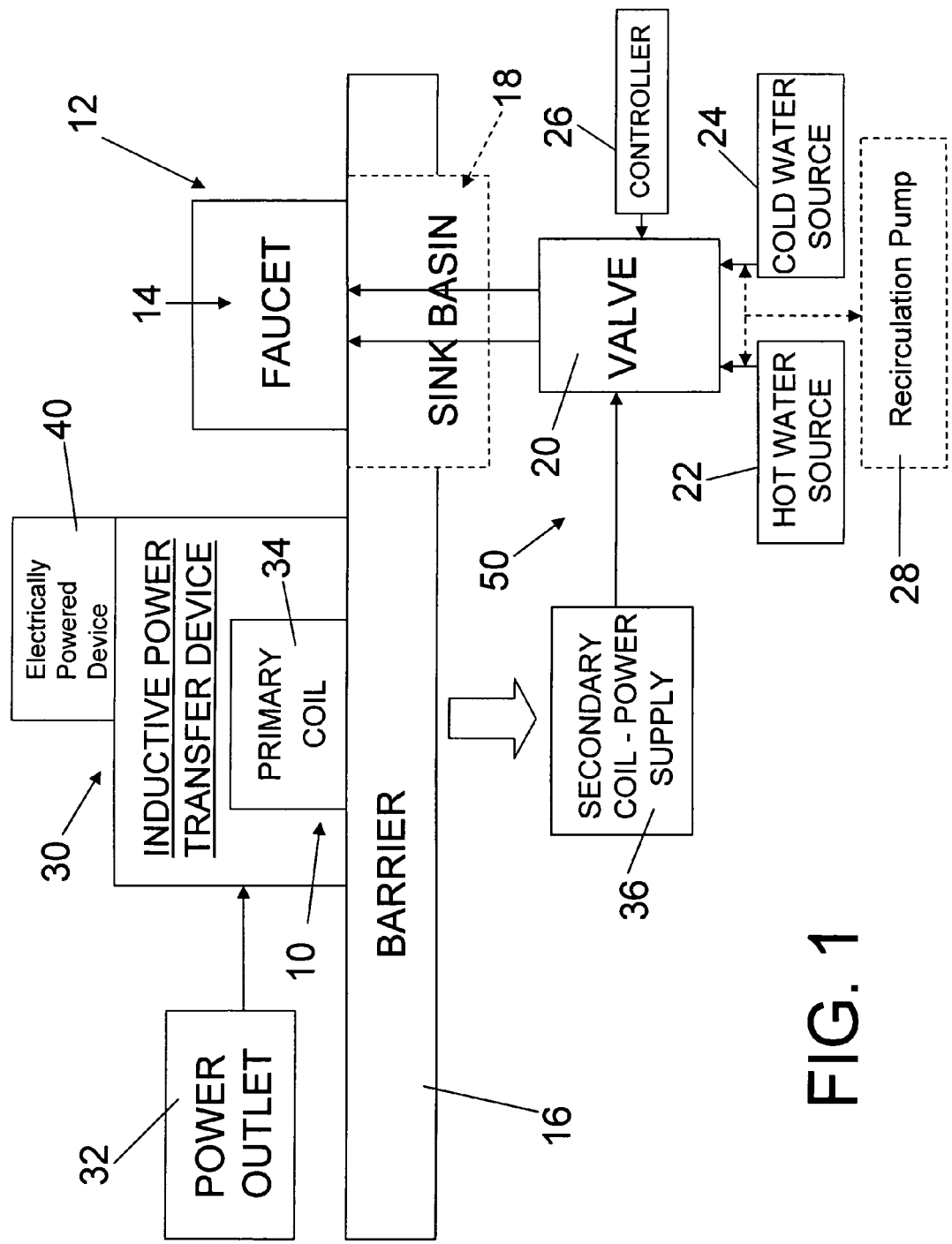
FIG. 1 is a block diagram illustrating a wireless power transfer device for a fluid delivery apparatus.

FIG. 1 is a block diagram illustrating one embodiment of a wireless power transfer device 10 for a fluid delivery apparatus 12. The fluid delivery apparatus 12 illustratively includes a faucet 14 located on a first side of a barrier 16 such as a countertop, wall, cabinet, or other enclosure. In one embodiment such as in a kitchen or bathroom application, faucet 14 is located adjacent a sink basin 18. Fluid delivery apparatus 12 further comprises a valve 20 located a second side of barrier 16, which is typically below the countertop, within a cabinet, behind a wall, or within another enclosure. The valve 20 typically mixes water from a hot water source 22 and cold water from a cold water source 24 to provide fluid of a desired flow rate and temperature to a fluid outlet of faucet 14.

In an illustrated embodiment, the valve 20 is in an electronic proportioning valve controlled by a controller 26 to control temperature and flow rate of fluid based on inputs received from controller 26. Examples of electronically controlled valves are described in U.S. patent application Ser. No. 11/109,281 entitled ELECTRONIC PORTIONING VALVE and PCT International Application No. PCT/US2007/60512 entitled ELECTRONIC MIXING VALVE ASSEMBLY, the disclosures of which are incorporated herein by reference.

A recirculation pump 28 may also be located on the second side of the barrier 16 such as under the countertop, within the cabinet, behind the wall within another enclosure. Recirculation pump 28 is used to provide "quick hot" functionality to the faucet 14. Recirculation pump 28 typically includes a cross-over valve coupled between the hot water source 22 and cold water source 24 supply lines in a conventional manner. The recirculation pump 28 circulates water from the hot water source 22 to the cold water source 24 to maintain water of a selected temperature available to the valve 20.

As discussed above, when it is desired to install a valve 20, recirculation pump 28, or other electrically powered component 50 on the second side of barrier 16, such installation is often complicated by the lack of an available power outlets on the second side of barrier 16, such as under a countertop, inside a cabinet, or behind a wall. The present invention provides a wireless power delivery device 10 including an inductive power transfer device 30 located on the first side of the barrier 16, such as above the countertop or outside the wall or cabinet where there is easy access to power outlets.

Inductive power transfer device 30 may be plugged into a standard power outlet 32. Inductive power transfer device 30 includes a primary coil 34. A secondary coil 36 is located on the second side of the barrier 16, such as below the countertop, inside the cabinet, or behind the wall. A secondary coil 36 is electrically coupled to the fluid delivery apparatus component 50 which is illustratively valve 20 and controller 26 and/or recirculation pump 28 shown in FIG. 1. Other electrically powered components 50 of fluid delivery apparatus 12 are discussed below.

Wireless power transfer device 10 may illustratively be any type of suitable wireless power transfer device such as the inductive power transfer device 30 and the secondary coil 36. An illustrative inductive coil assembly is shown in U.S. Pat. No. 6,975,198 which is expressly incorporated herein by reference. The inductive power transfer device 30 provides power to the secondary coil 36 without having to connect the secondary coil 36 to the wiring of a building in an area on the second side of the barrier 16. The wireless connection provides electrical isolation for the electrical components 50 of fluid delivery device 12 since these components are not hard wired to the electrical wiring of the building. It is understood that multiple primary coils 34 and secondary coils 36 may be provided to power a plurality of electrically powered components 50.

In addition to power transmission, data can also be transmitted via inductive power transfer device 30 from the primary coil 34 to the secondary coil 36. An electrically powered device 40 may be integrated with the inductive power transfer device 30. In one embodiment, a user interface device permits an operator to provide instructions for controlling the fluid delivery apparatus 12. Control signals and power are provided from inductive power transfer device 30 to the secondary coil 26 to power the valve 20 and controller 26 and also to provide input data signals for controller 26 from the user interface device 40.

Figure 2:
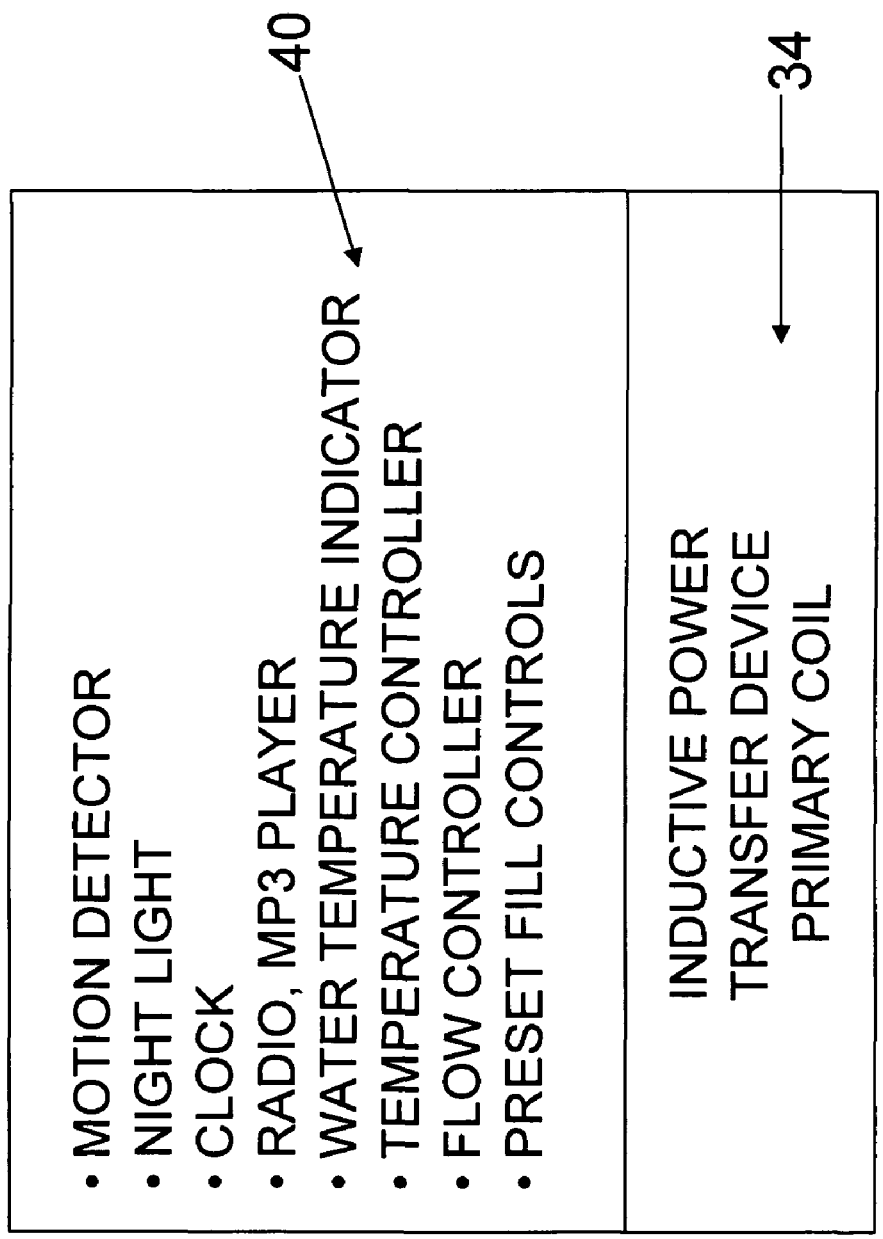
FIG. 2 is a block diagram illustrating various electrically powered devices located on a first side of a barrier.

FIG. 2 illustrates other examples of electrically powered devices 40 which may be provided along with the inductive power transfer device 30 on the first side of the barrier 16. Illustratively, the electrically powered device 40 may be a night light, a clock, a radio and/or MP3 player, a water temperature indicator, a temperature controller, a flow controller, and/or a user input device for setting temperature, flow, or other preset fill conditions and controls of the fluid delivery apparatus 12. In one illustrative embodiment, a motion detector 40 may detect movement adjacent the faucet 12 and turn on a night light, radio, or other device 40. The motion detector may also send a wireless signal through the primary coil 34 to the secondary coil 36 to control operation of an electrical component 50 or the second side of barrier 16, such as, for example, activating the recirculation pump 28.

Figure 3:
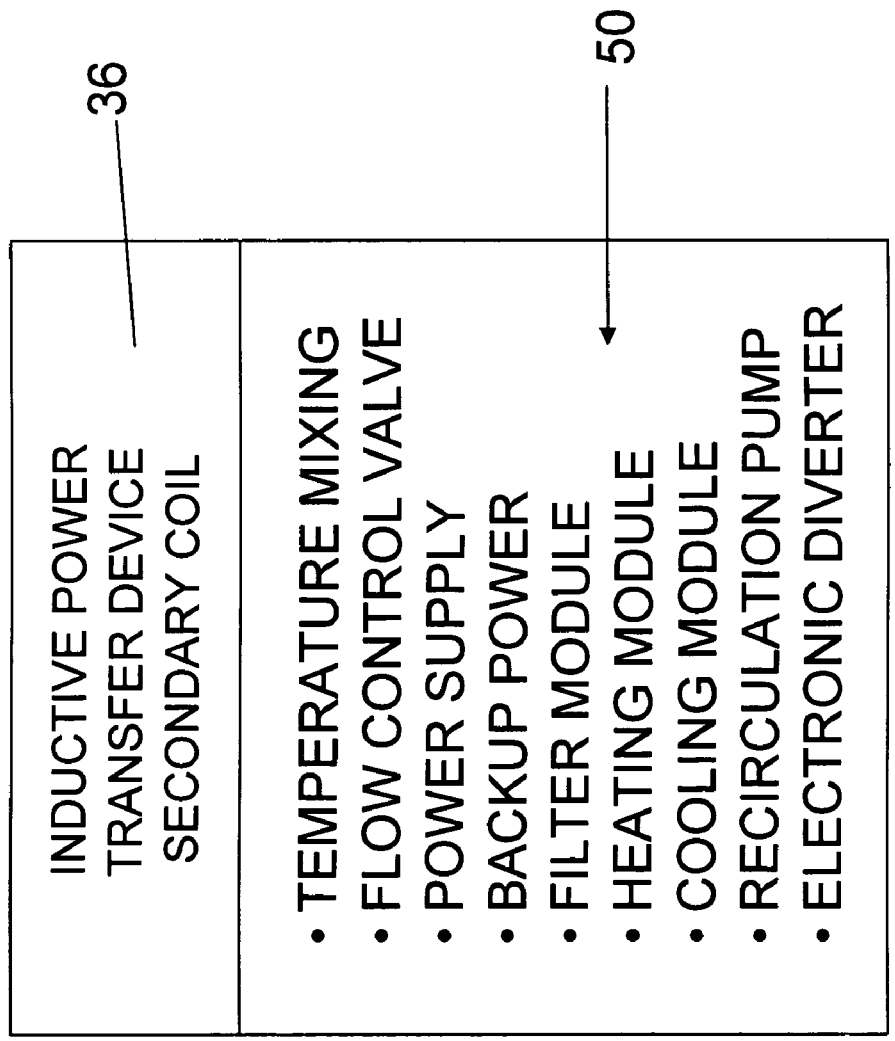
FIG. 3 is a block diagram illustrating various electrically powered component components located on a second side of the barrier.

FIG. 3 discloses other electrically powered components 50 of the fluid delivery apparatus 12 which may be located on the second side of barrier 16, such as under the countertop or behind the wall, and powered via secondary coil 36. Such components 50 illustratively include temperature mixing valves, flow control valves, power supplies, back-up power supplies, a filter module, a heating module, a cooling module, a recirculation pump, and/or an electronic diverter.

It is understood that other electrical components 50 suitable for use with the fluid delivery apparatus 12 and may also be powered by secondary coil 36. For example, the wireless power transfer apparatus 10 may also be used to power other components for fluid delivery systems such as, for example, components disclosed in U.S. Application Ser. Nos. 60/794,229 and 11/737,727, entitled ELECTRONIC USER INTERFACE FOR ELECTRONIC MIXING OF WATER FOR RESIDENTIAL FAUCETS; PCT International Application No. PCT/US2006/044023 entitled INTEGRATED BATHROOM ELECTRONIC SYSTEM; U.S. application Ser. No. 11/324,901 entitled BATTERY BOX ASSEMBLY; and U.S. application Ser. No. 11/326,986 entitled VALVE BODY ASSEMBLY WITH ELECTRONIC SWITCHING the disclosures of which are incorporated by reference herein.

As discussed above, in one illustrated embodiment, the barrier 16 is a countertop such as in a kitchen, bathroom, or other area. The inductive power transfer device 30 is illustratively plugged into power outlet 32 above the countertop barrier 16. The electrically powered component 50 and the secondary coil of the power supply 36 are located below the countertop barrier 16, such as in a cabinet or other enclosure which often does not have access to an electrical power outlet. Therefore, the primary coil 34 located above the countertop barrier 16 supplies power to (and control signals, if desired) the secondary coil 36 located below the countertop barrier 16 to power and/or control the electrically powered component 50.

In another illustrated embodiment, the barrier 16 may be a wall or other enclosure. In this embodiment, such as for use in a shower, for example, the faucet 14 is located on the outside of the wall barrier 16 while the secondary coil power supply 36, valve 20, recirculation pump 28, and other electrically powered component 50 discussed herein are located behind the wall barrier 16 on an opposite side of the wall from the faucet 14. In this embodiment, the inductive power transfer device 30 including primary coil 34 is located outside the wall barrier 16 with the faucet 14. In another embodiment, the inductive power transfer device 30 may be located within a closet or other area adjacent the shower to transfer power from the primary coil 34 on a first side of the wall barrier 16 to the secondary coil 36 on the opposite side of the wall barrier 16 to power and/or control the electrically powered component 50 as described herein.

Although the invention has been described in detail with reference to certain illustrated embodiments, variations and modifications exist within the spirit and scope of the invention as described and defined in the following claims.

The invention claimed is:

1. A fluid delivery apparatus configured to supply fluid to a sink basin mounted in a countertop, the countertop being located above an enclosure without an electrical power outlet located in the enclosure, the fluid delivery apparatus comprising:
   a faucet providing a fluid outlet located above the countertop adjacent the sink basin;
   at least one electrically powered component located below the countertop within the enclosure, the electrical component being coupled to the faucet and performing a function of the fluid delivery apparatus; and
   a wireless power transfer device comprising a first portion and a second portion, the first portion of the wireless power transfer device being located above the countertop and coupled to a power supply outside of the enclosure and the second portion of the wireless power transfer device being located below the countertop inside of the enclosure to receive power from the first portion, the second portion being electrically coupled and supplying power to the electrically powered component.

2. The apparatus of claim 1, further comprising a user interface device located outside of the enclosure, the user interface device being configured to receive an input from a user to control the fluid delivery apparatus, and wherein the first portion of the wireless power transfer device transmits data signals from the user interface device to the second portion, the data signals being used by the electrically powered component to control the fluid delivery apparatus.

3. The apparatus of claim 2, wherein the user interface device is a portable device.

4. The apparatus of claim 1, further comprising an electrically powered device coupled to the first portion of the wireless power transfer device outside of the enclosure.

5. The apparatus of claim 4, wherein the electrically powered device also includes the first portion of the wireless power transfer device therein.

6. The apparatus of claim 4, wherein the electrically powered device comprises at least one of a night light, a clock, a radio, an MP3 player, a water temperature indicator, a temperature controller, a flow controller, and a user interface device for setting temperature, flow, or preset fill conditions.

7. The apparatus of claim 1, wherein the first portion of the wireless power transfer device is a primary coil and the second portion of the wireless power transfer device is a secondary coil located in proximity to the primary coil.

8. The apparatus of claim 7, wherein the at least one electrically powered component comprises at least one of a temperature mixing valve, a flow control valve, a power supply, a back-up power supply, a filter module, a heating module, a cooling module, a recirculation pump, and an electronic diverter.

9. The apparatus of claim 1, wherein the at least one electrically powered component comprises an electronic valve in fluid communication with a fluid source and the fluid outlet, the electronic valve further comprising a controller configured to control an operation of the valve.

10. The apparatus of claim 1, further comprising an object detection sensor located outside of the enclosure.

11. The apparatus of claim 10, further comprising a night light, the object detection sensor turning on the night light in response to detecting an object.

12. The apparatus of claim 10, further comprising a hot water recirculation pump located inside of the enclosure and powered by the second portion of the wireless power transfer device, the object detection sensor turning on the recirculation pump in response to detecting an object.

13. The apparatus of claim 10, wherein the object detection sensor comprises a motion detector.

14. The apparatus of claim 1, further comprising a diverter valve in fluid communication with an internal waterway of the fluid outlet and including a first position corresponding to a stream flow pattern and a second position corresponding to a spray flow pattern.

15. The apparatus of claim 14, wherein a controller actuates the diverter valve to position the diverter valve in a predetermined position corresponding to one of the first position and the second position.

16. A method for delivering fluid to a sink basin mounted in a countertop, the countertop being located above an enclosure without an electrical power outlet located in the enclosure, the method comprising:
   locating a faucet including a fluid outlet above the countertop adjacent the sink basin;
   providing at least one electrically powered component located below the countertop within the enclosure, the electrical component being coupled to the faucet and performing a function of the fluid delivery apparatus; and
   providing a wireless power transfer device having a first portion and a second portion, the first portion of the wireless power transfer device being located above the countertop and coupled to a power supply outside of the enclosure and the second portion of the wireless power transfer device being located below the countertop inside the enclosure to receive power from the first portion wirelessly, the second portion of the wireless power transfer device being electrically coupled to and supplying power to the electrically powered component.

17. The method of claim 16, further comprising wirelessly transmitting control signals from a user interface device to the electrically powered component to control the fluid delivery apparatus.

18. The method of claim 17, wherein the step of wirelessly transmitting control signals from the user interface device to the electrically powered component is performed by the wireless power transfer device.

19. The method of claim 16, further comprising the step of providing an electrically powered device located outside of the enclosure, the electrically powered device comprising at least one of a night light, a clock, a radio, an MP3 player, a water temperature indicator, a temperature controller, a flow controller, and a user interface device for setting temperature, flow, or preset fill conditions.

20. The method of claim 16, wherein the at least one electrically powered component located below the countertop within the enclosure comprises at least one of a temperature mixing valve, a flow control valve, a power supply, a back-up power supply, a filter module, a heating module, a cooling module, a recirculation pump, and an electronic diverter.

21. A method for delivering fluid in a room divided into first and second separate areas by a physical barrier located within a room, the first area of the room being located on a first side of the barrier having access to an electrical power supply and the second area of the room being located on a second, opposite side of the barrier having no access to the electrical power supply, the method comprising:

locating a fluid outlet on the first side of the barrier to supply fluid to the first area of the room;

locating a plurality of fluid delivery components including a valve, at least one fluid supply line coupled to the valve, and at least one electrically powered component on the second side of the barrier in the second area of the room, the at least one electrical component performing a function of the fluid delivery apparatus; and providing a wireless power transfer device having a first portion and a second portion, the first portion of the wireless power transfer device being located in the first area of the room on the first side of the barrier spaced apart from the plurality of fluid delivery components located in the second area of the room on the second, opposite side of the barrier, the first portion of the wireless power transfer device being coupled to the electrical power supply located in the first area of the room on the first side of the barrier, and the second portion of the wireless power transfer device being located in the second area of the room on the second, opposite side of the barrier to receive power from the first portion of the wireless power transfer device wirelessly through the barrier, the second portion of the wireless power transfer device being electrically coupled to and supplying power to the at least one electrically powered component.

22. The method of claim 21, wherein the barrier is a wall in the room, and the fluid outlet includes a shower head.

23. The method of claim 21, wherein the barrier is a countertop, the first area being located above the countertop and the second area being located below the countertop.

24. The method of claim 21, wherein the at least one electrically powered component includes an electronic valve in fluid communication with a fluid source and the fluid outlet and a controller configured to control an operation of the electronic valve.

25. The method of claim 21, wherein the at least one electrically powered component includes at least one of a temperature mixing valve, a flow control valve, a power supply, a back-up power supply, a filter module, a heating module, a cooling module, a recirculation pump, and an electronic diverter.

* * * * *